United States Patent
Annampedu et al.

(10) Patent No.: US 8,498,072 B2
(45) Date of Patent: Jul. 30, 2013

(54) SYSTEMS AND METHODS FOR SPIRAL WAVEFORM DETECTION

(75) Inventors: Viswanath Annampedu, Schnecksville, PA (US); Jeffrey P. Grundvig, Loveland, CO (US); Keith R. Bloss, Schnecksville, PA (US); Vishal Narielwala, Edina, MN (US)

(73) Assignee: LSI Corporation, San Jose, CA (US)

( * ) Notice: Subject to any disclaimer, the term of this patent is extended or adjusted under 35 U.S.C. 154(b) by 348 days.

(21) Appl. No.: 12/955,821

(22) Filed: Nov. 29, 2010

(65) Prior Publication Data

US 2012/0134043 A1    May 31, 2012

(51) Int. Cl.
G11B 5/09 (2006.01)
G11B 21/02 (2006.01)

(52) U.S. Cl.
USPC .............................. 360/39; 360/75

(58) Field of Classification Search
None
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy |
| 5,668,679 A | 9/1997 | Swearingen et al. |
| 5,696,639 A | 12/1997 | Spurbeck et al. |
| 5,781,129 A | 7/1998 | Schwartz et al. |
| 5,787,125 A | 7/1998 | Mittel |
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Regina N Holder

(74) *Attorney, Agent, or Firm* — Hamilton DeSanctis & Cha

(57) ABSTRACT

Various embodiments of the present invention provide systems and methods for determining a location of a spiral pattern. As an example, a location detection circuits is discussed that includes: a pattern detection circuit, a computation circuit, and a center determination circuit. The pattern detection circuit is operable to identify a subset of a series of data samples corresponding to a defined pattern, and to indicate a location of the identified subset of the series of data samples. The series of data samples corresponds to a spiral pattern. The computation circuit operable to sum an absolute value of each sample of the subset of the series of data samples to yield a sum. The center determination circuit operable to identify a location of the spiral pattern using the sum.

20 Claims, 9 Drawing Sheets

U.S. PATENT DOCUMENTS

| | | |
|---|---|---|
| 5,955,783 A | 9/1999 | Ben-Efraim |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,069,583 A | 5/2000 | Silvestrin et al. |
| 6,081,397 A | 6/2000 | Belser |
| 6,111,712 A | 8/2000 | Vishakhadatta et al. |
| 6,208,478 B1 | 3/2001 | Chiu et al. |
| 6,278,591 B1 | 8/2001 | Chang et al. |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,490,110 B2 | 12/2002 | Reed et al. |
| 6,493,162 B1 | 12/2002 | Fredrickson |
| 6,519,102 B1 | 2/2003 | Smith |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,876,511 B2 | 4/2005 | Koyanagi |
| 6,912,099 B2 | 6/2005 | Annampedu et al. |
| 6,963,521 B2 | 11/2005 | Hayashi |
| 6,999,257 B2 | 2/2006 | Takeo |
| 6,999,264 B2 | 2/2006 | Ehrlich |
| 7,002,761 B1 | 2/2006 | Sutardja et al. |
| 7,002,767 B2 | 2/2006 | Annampedu et al. |
| 7,038,875 B2 | 5/2006 | Lou et al. |
| 7,054,088 B2 | 5/2006 | Yamazake et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,136,250 B1 | 11/2006 | Wu et al. |
| 7,154,689 B1 | 12/2006 | Shepherd et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,411,531 B2 | 8/2008 | Aziz et al. |
| 7,420,498 B2 | 9/2008 | Barrenscheen |
| 7,423,827 B2 | 9/2008 | Neville et al. |
| 7,446,690 B2 | 11/2008 | Kao |
| 7,499,238 B2 | 3/2009 | Annampedu |
| 7,525,460 B1 | 4/2009 | Liu et al. |
| 7,602,568 B1 | 10/2009 | Katchmart |
| 7,620,101 B1 | 11/2009 | Jenkins |
| 7,630,155 B2 | 12/2009 | Maruyama et al. |
| 2002/0001151 A1 | 1/2002 | Lake |
| 2002/0150179 A1 | 10/2002 | Leis et al. |
| 2002/0176185 A1 | 11/2002 | Fayeulle et al. |
| 2002/0181377 A1 | 12/2002 | Nagata et al. |
| 2003/0095350 A1 | 5/2003 | Annampedu et al. |
| 2004/0179460 A1 | 9/2004 | Furumiya et al. |
| 2005/0046982 A1 | 3/2005 | Liu et al. |
| 2005/0157415 A1 | 7/2005 | Chiang |
| 2005/0243455 A1 | 11/2005 | Annampedu |
| 2007/0064847 A1 | 3/2007 | Gaedke |
| 2007/0071152 A1 | 3/2007 | Chen et al. |
| 2007/0103805 A1 | 5/2007 | Hayashi et al. |
| 2007/0104300 A1 | 5/2007 | Esumi et al. |
| 2007/0183073 A1 | 8/2007 | Sutardja et al. |
| 2007/0230015 A1 | 10/2007 | Yamashita et al. |
| 2007/0253084 A1* | 11/2007 | Annampedu et al. ........... 360/39 |
| 2007/0263311 A1 | 11/2007 | Smith |
| 2008/0056403 A1 | 3/2008 | Wilson |
| 2008/0080082 A1 | 4/2008 | Erden et al. |
| 2008/0212715 A1 | 9/2008 | Chang |
| 2008/0266693 A1 | 10/2008 | Bliss et al. |
| 2009/0002862 A1 | 1/2009 | Park et al. |
| 2009/0142620 A1 | 6/2009 | Yamamoto et al. |
| 2009/0245448 A1 | 10/2009 | Ran et al. |
| 2009/0274247 A1 | 11/2009 | Galbraith et al. |

OTHER PUBLICATIONS

U.S. Appl. No. 12/851,475, filed Aug. 5, 2010, Annampedu, Viswanath.
U.S. Appl. No. 12/887,327, filed Sep. 21, 2010, Llu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
Annampedu and Aziz, "Adaptive Algorithms for Asynchronous Detection of Coded Servo Signals Based on Interpolation", IEEE Transactions on Magnetics, vol. 41, No. 10, Oct. 20, 2005.
Aziz, Annampedu, "Interpolation Based Max.-Likelihood(ML) Detection Asynchronous Servo Repeatable Run Out Data", Digest, IEEE Int'l Mag. Conf. vol. 42 No. 10 pp. 2585-2587 Oct. 2006.

* cited by examiner

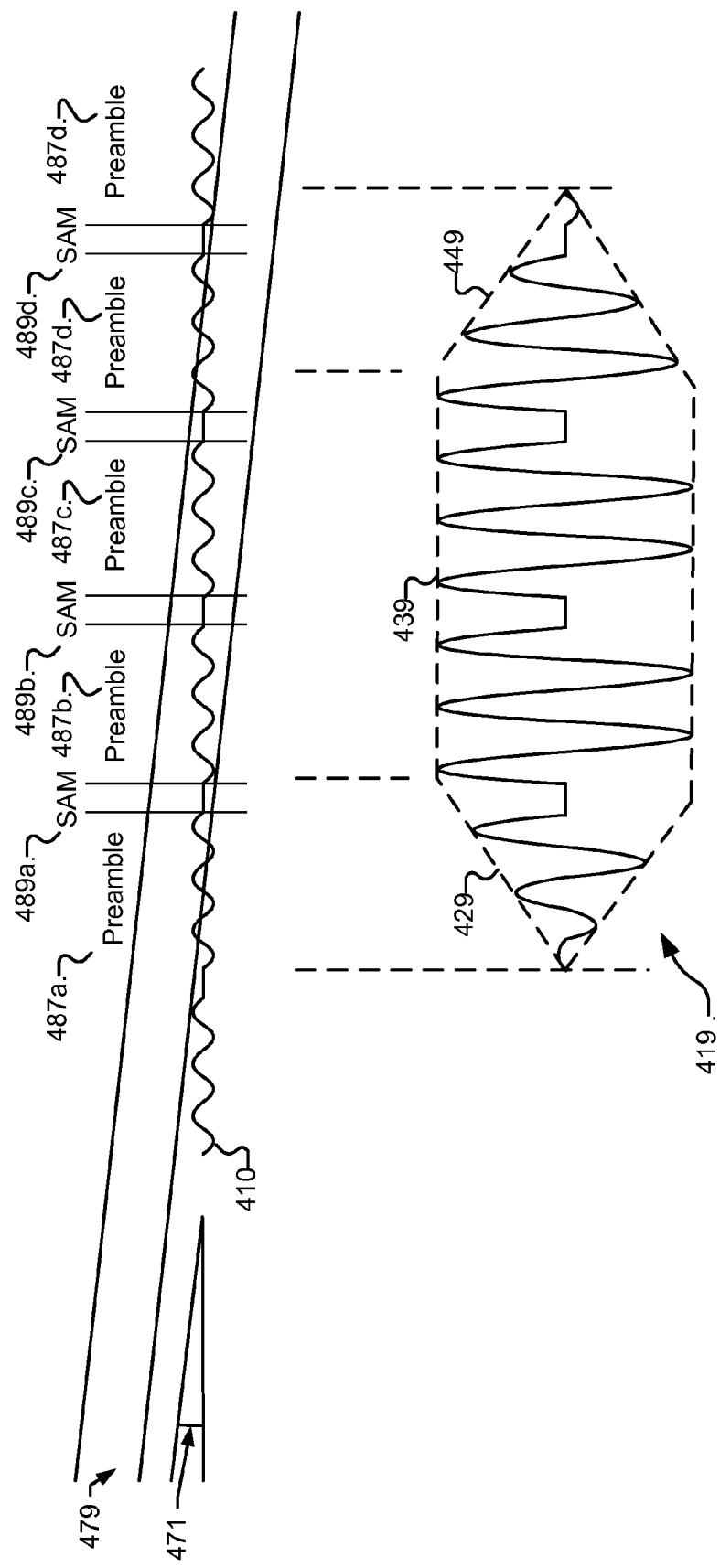

SYSTEMS AND METHODS FOR SPIRAL WAVEFORM DETECTION

BACKGROUND OF THE INVENTION

The present inventions are related to storage media, and more particularly to systems and methods for preparing servo data on a storage medium.

A typical digital magnetic storage medium includes a number of storage locations where digital data may be stored. Data is written to the medium by positioning a read/write head assembly over the medium at a selected location, and subsequently passing a modulated electric current through the head assembly such that a corresponding magnetic flux pattern is induced in the storage medium. To retrieve the stored data, the head assembly is positioned anew over the track. In this position, the previously stored magnetic flux pattern induces a current in the head assembly that can be converted to the previously recorded digital data.

The storage locations on the magnetic storage medium are typically arranged as a serial pattern along concentric circles known as tracks. FIG. 1 shows a storage medium 1 with two exemplary tracks 20, 22 as dashed lines. The tracks are segregated by servo data written within wedges 18, 19. These wedges include data and supporting bit patterns that are used for control and synchronization of the head assembly over a desired storage location on storage medium 1. The data and supporting bit patterns used to derive the control and synchronization is depicted as a pattern 10 that includes a preamble 11, a sector address mark 12, a Gray code 13 and a burst 14. It should be noted that while two tracks and two wedges are shown, hundreds of each would typically be included on a given storage medium.

Traditionally, the servo data within wedges 18, 19 has been written by an external servo writer which is costly both in terms of equipment and time. In some cases, disk drive manufacturers have utilized the read/write head assembly to write the servo data using a process known as self servo writing. As one example of this process, an external writer is used to write servo data for only a limited number a tracks at an outer edge of storage medium 100. Using this as a guide, the head assembly can then be used to write the servo data corresponding to the inner tracks. As another example, a reference pattern is applied more generally to storage medium 1 in a known way, but not corresponding directly to wedges 18, 19. While both approaches offer viable alternatives to the traditional approach, each requires additional capability for positioning the head assembly.

Hence, for at least the aforementioned reasons, there exists a need in the art for advanced systems and methods for head assembly positioning during self servo writing.

BRIEF SUMMARY OF THE INVENTION

The present inventions are related to storage media, and more particularly to systems and methods for preparing servo data on a storage medium.

Various embodiments of the present invention provide location detection circuits. Such circuits include: a pattern detection circuit, a computation circuit, and a center determination circuit. The pattern detection circuit is operable to identify a subset of a series of data samples corresponding to a defined pattern, and to indicate a location of the identified subset of the series of data samples. The series of data samples corresponds to a spiral pattern. The computation circuit operable to sum an absolute value of each sample of the subset of the series of data samples to yield a sum. The center determination circuit operable to identify a location of the spiral pattern using the sum. In some cases, the aforementioned circuits are implemented as part of an integrated circuit. In particular cases, the aforementioned circuits are implemented as part of a storage device.

In some instances of the aforementioned embodiments, the sum is a current sum, and identifying the location of the spiral pattern using the sum includes: comparing the current sum with a previously calculated sum, and replacing the previously calculated sum with the current sum where the current sum is greater than the previously calculated sum. In other instances of the aforementioned embodiments, the sum is a current sum, and identifying the location of the spiral pattern using the sum includes: comparing the current sum with a previously calculated sum, and selecting the location of the identified subset of the series of data samples as a center of the spiral pattern where the current sum is less than the previously calculated sum.

Other embodiments of the present invention provide methods for locating a spiral pattern. The methods include: receiving a series of data samples corresponding to an analog input derived from a spiral pattern; performing a defined pattern detection on the series of data samples where a subset of the series of data samples corresponds to a defined pattern; providing a pattern found indication; summing an absolute value of each sample of the subset of the series of data samples to yield a sum; and determining a location of a spiral pattern based on the sum. In some cases, the defined pattern is a sector address mark pattern. In one or more cases, the spiral pattern includes a group of preamble patterns interleaved with a group of sector address mark patterns.

In some instances of the aforementioned embodiments, the sum is a current sum, and determining the location of the spiral pattern includes: comparing the current sum with a previously calculated sum, replacing the previously calculated sum with the current sum where the current sum is greater than the previously calculated sum. In other instances of the aforementioned embodiments, the sum is a current sum, and determining the location of the spiral pattern includes: comparing the current sum with a previously calculated sum, selecting a location of the pattern found indication as a center of the spiral pattern where the current sum is less than the previously calculated sum. In yet other instances of the aforementioned embodiments, the subset of the series of data samples is a first subset of data samples, the pattern found indication is a first pattern found indication, and determining the location of the spiral pattern includes performing a defined pattern detection on the series of data samples. A second subset of the series of data samples corresponds to the defined pattern and providing a second pattern found indication, and the second pattern found indication corresponds to a region of the spiral pattern exhibiting increasing amplitude. The instances further include: storing a first location corresponding to the second pattern found indication; performing a defined pattern detection on the series of data samples, where a third subset of the series of data samples corresponds to the defined pattern and providing a third pattern found indication, and the third pattern found indication corresponds to a region of the spiral pattern exhibiting decreasing amplitude; and averaging the first location with a second location corresponding to the third pattern found indication to yield a center of the spiral pattern. The region of the spiral pattern exhibiting increasing amplitude is determined by: summing an absolute value of each sample of the second subset of the series of data samples to yield a previous sum; and comparing the current sum with the previous sum to reveal that the current sum is greater than the previous sum. The region of the spiral pattern exhibiting decreasing amplitude is determined by: summing an absolute value of each sample of the third subset of the series of data samples to yield a succeeding sum; and comparing the current sum with the succeeding sum where the current sum is greater than the succeeding sum.

Yet other embodiments of the present invention provide storage devices that include: a storage medium having a spiral pattern stored on the storage medium, a processing circuit operable to receive a signal corresponding to the spiral pattern and to provide a series of data samples corresponding to the spiral pattern, and a location detection circuit. The location detection circuit includes: a pattern detection circuit, a computation circuit, and a center determination circuit. The pattern detection circuit is operable to receive the series of data samples, to identify a subset of the series of data samples corresponding to a defined pattern, and to indicate a location of the identified subset of the series of data samples. The computation circuit is operable to sum an absolute value of each sample of the subset of the series of data samples to yield a sum. The center determination circuit is operable to identify a location of the spiral pattern on the storage medium using the sum.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

FIGS. 4a-4d graphically depict a spiral pattern in relation to tracks on a storage medium, and allows for discussion of the various embodiments of the present invention;

DETAILED DESCRIPTION OF THE INVENTION

The present inventions are related to storage media, and more particularly to systems and methods for preparing servo data on a storage medium.

Figure 1:
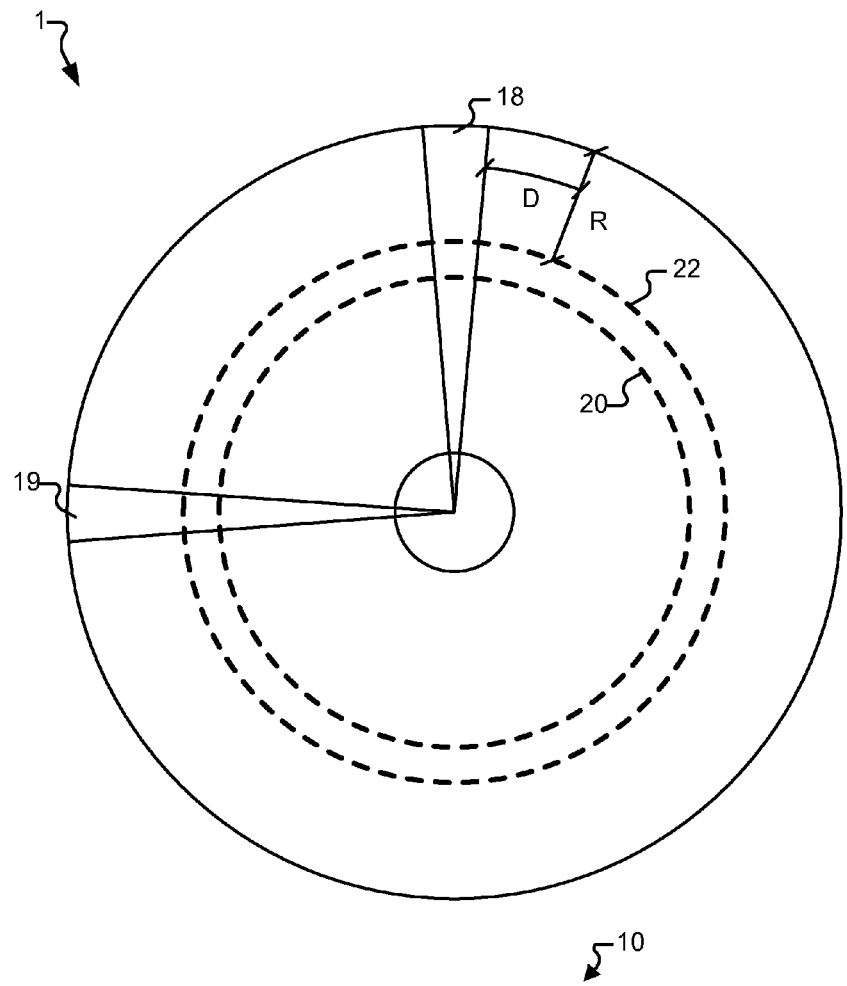
FIG. 1 is a block diagram of a known magnetic storage medium and sector data scheme.
Figure 2:
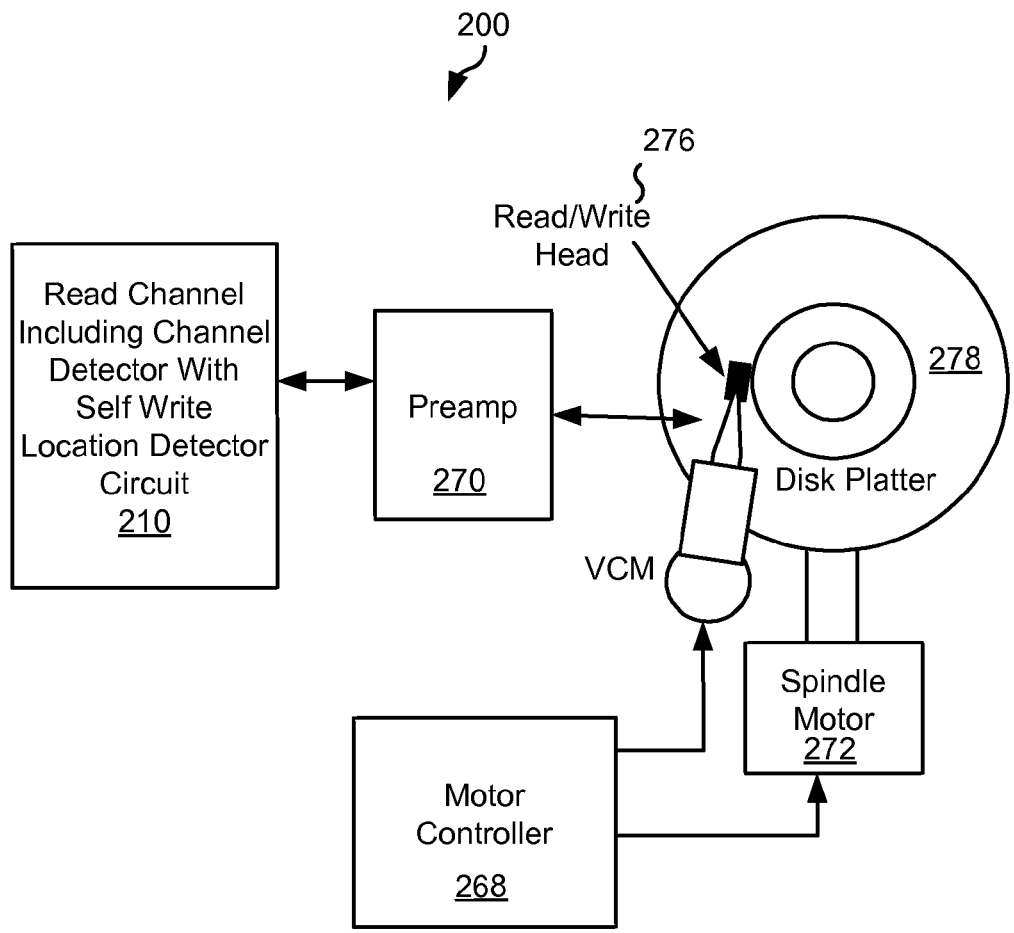
FIG. 2 shows a storage system including a read channel circuit with a self write location detector circuit in accordance with some embodiments of the present invention.

Turning to FIG. 2, a storage system 200 including read channel circuit 210 with a self write location detector circuit is shown in accordance with various embodiments of the present invention. Storage system 200 may be, for example, a hard disk drive. The self write location detector circuit included in read channel circuit 210 may be, but is not limited to, a processing circuit similar to that discussed below in relation to FIG. 3. In some cases, the self write location circuit may operate similar to that discussed below in relation to FIG. 5.

Storage system 200 also includes a preamplifier 270, an interface controller 220, a hard disk controller 266, a motor controller 268, a spindle motor 272, a disk platter 278, and a read/write head assembly 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with a perpendicular recording scheme. For example, the magnetic signals may be recorded as either longitudinal or perpendicular recorded signals.

In a typical self write operation, read/write head assembly 276 traverses above the surface of disk platter 278 under the control of motor controller 268 and spindle motor 272 that rotates disk platter at a known rate. Any spiral pattern previously written on disk platter 278 is detected by read/write head assembly 276, and an electrical signal corresponding to the detected pattern is provided to preamplifier 270. Preamplifier 270 amplifies the received signal and provides the amplified signal to read channel circuit 210. As data is received by read channel circuit 210, it is determined whether a spiral reference pattern or waveform (i.e., spiral pattern) is detected and whether a sector address mark of the spiral pattern is detected. Any detected sector address mark patterns are used to fix a location that will be the bases of subsequently written servo data fields. Thus, when a location of the spiral pattern is fixed using the detected sector address marks, a counter is started that tracks a distance from the located spiral pattern. After a determined distance, read/write head assembly 276 begins writing the desired servo data at the defined distance from the detected spiral pattern. This process is continued until all of the desired servo data fields are written.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
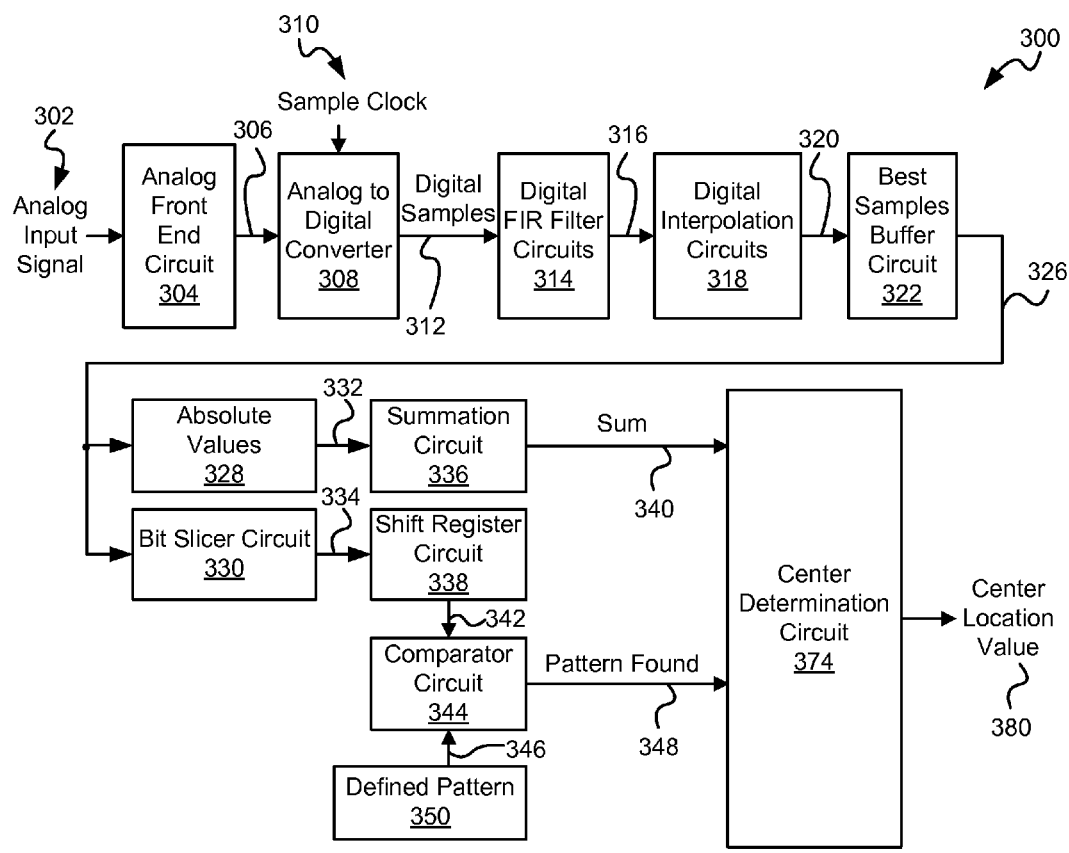
FIG. 3 depicts a magnitude based spiral waveform detector circuit in accordance with one or more embodiments of the present invention.

Turning to FIG. 3, a magnitude based spiral waveform detector circuit 300 is shown in accordance with one or more embodiments of the present invention. Magnitude based spiral waveform detector circuit 300 includes an analog front end circuit 304 that receives an analog input signal 302 and provides a corresponding analog signal 306. Analog front end circuit 304 may include any circuitry known in the art that is capable of receiving an analog input signal and providing a modified analog signal. In one particular instance, analog front end circuit 304 includes an amplifier that receives and amplifies analog input signal 302, an analog filter that reduces any noise exhibited at the output of the amplifier, and an analog to digital converter that receives the filtered signal and provides a series of digital samples corresponding to the magnitude of the filtered signal at defined sampling points. Based upon the disclosure provided herein, one of ordinary skill in the art will recognize a variety of circuitry that may be included in analog front end circuit 304 in accordance with different embodiments of the present invention.

Analog signal 306 is provided to an analog to digital converter circuit 308. Analog to digital converter circuit 308 provides a series of digital samples 312 representing analog signal 306. Digital samples 312 are synchronized to a sample clock 310. Analog to digital converter circuit 308 may be any circuit or system known in the art that is capable of converting a continuous signal into a series of digital samples. Analog input signal 306 is a continuous signal representing a number of bit periods. The bit periods recur with a periodicity of T, and the sample clock causes analog to digital converter circuit 308 to generate a number of samples of analog input signal 302 for each period T. In one particular embodiment of the present invention, the number of samples is four for each period T. It should be noted that while the present embodiment is described as utilizing four samples per period, other embodiments of the present invention may use a lower sampling frequency or may use a higher sampling frequency. Based upon the disclosure provided herein, one of ordinary skill in the art will recognize a variety of sampling frequencies and corresponding bit periods that may be used in relation to different embodiments of the present invention. Analog input signal 302 may be derived from a variety of sources. For example, analog input signal 302 may be received from a read/write head assembly (not shown) disposed in relation to a storage medium (not shown). As another example, analog input signal 302 may be derived from a receiver circuit (not shown) that is receiving a wireless transmission. Based upon the disclosure provided herein, one of ordinary skill in the art will recognize a variety of other sources of analog input signal 302.

Digital samples 312 are provided to a bank of digital finite impulse response (FIR) filter circuits 314 that filters the received input and provides corresponding filtered outputs 316. The digital filter circuits 314 may be implemented using any digital filtering architecture or approach known in the art. Filtered outputs 316 are provided to a bank of digital interpolation circuits 318. In one particular embodiment of the present invention, seven digital interpolation circuits 318 are used such that eight phases of the selected filtered outputs 316 are provided as an interpolated output 320 to a best samples buffer circuit 322. Best samples buffer circuit 322 maintains at least samples that correspond to the maximums as minimums of analog input signal 302. Of note, the values stored in best samples buffer circuit 322 are the raw digital values that correspond to respectively to +1, 0, −1 values.

Figure 4A:
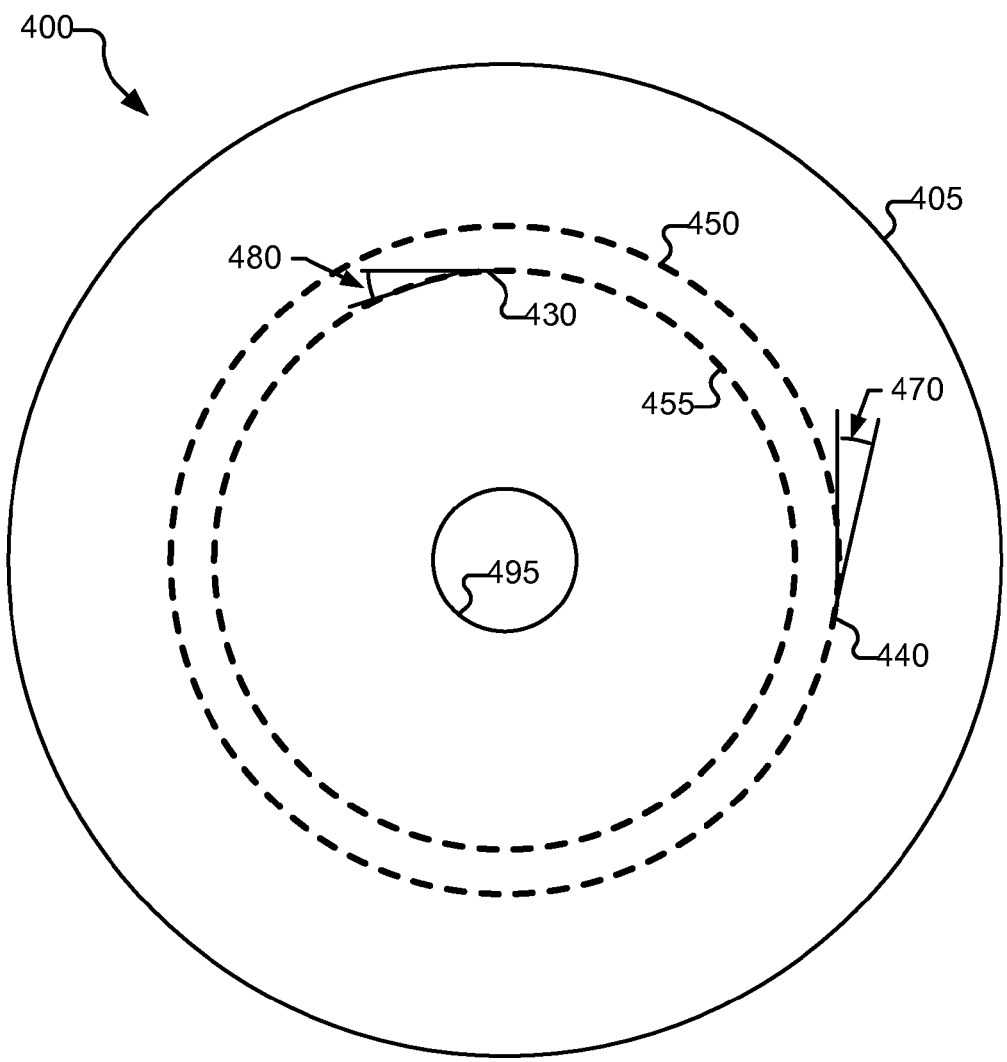
Figure 4B:
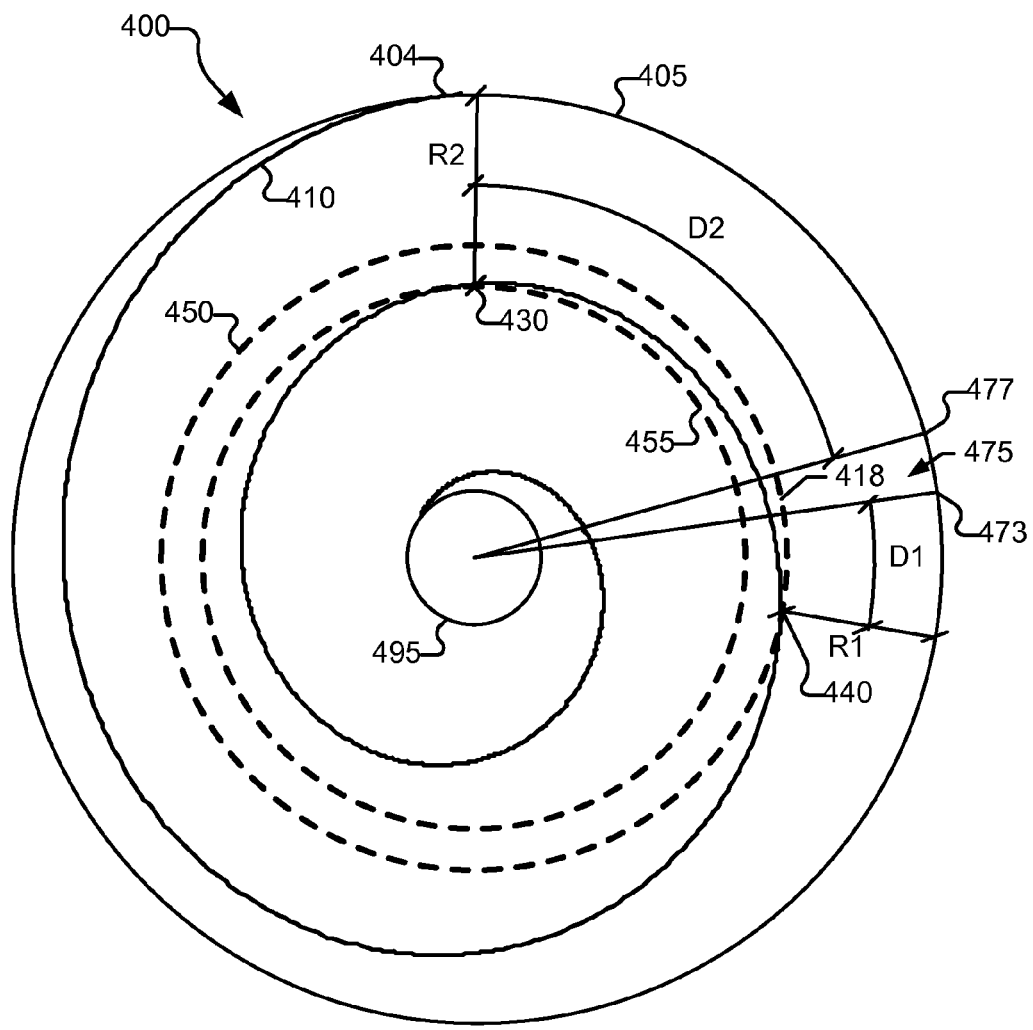
Figure 4D:
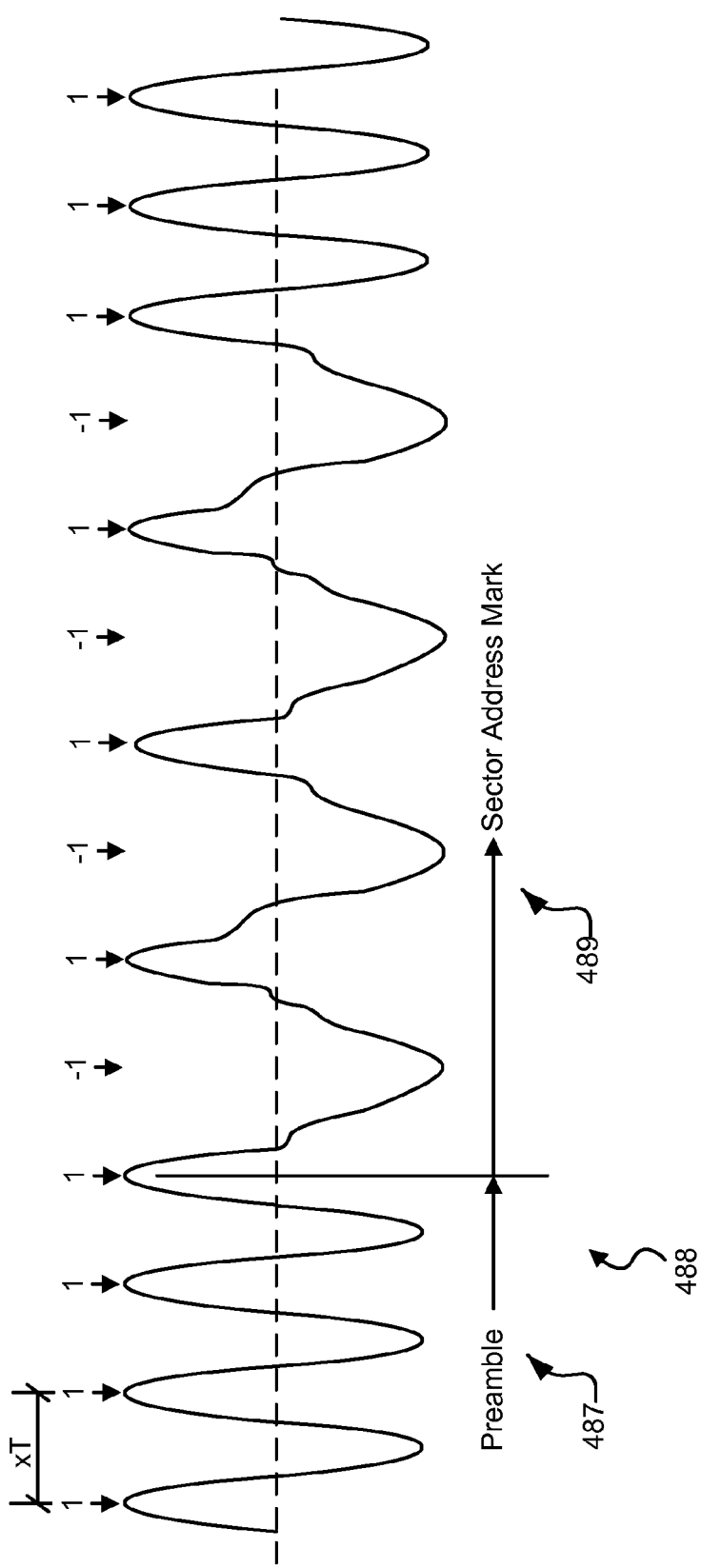

FIG. 4d shows an exemplary input signal 488 including both preamble patterns 487 and sector address mark patterns 489. A number of best samples (i.e., 1, 1, 1, 1, −1, 1, −1, 1, −1, 1, −1, 1, 1, 1) each offset by a number of samples (i.e., ×T). Of note, best samples buffer circuit 322 maintains the raw digital values corresponding to the peaks of input signal 488. Further, it should be noted that input signal 488 is a portion of a larger input signal discussed in relation to FIGS. 4a-4c below.

Referring back to FIG. 3, best samples 326 are provided to an absolute value circuit 328 and to a bit slicer circuit 330. Absolute value circuit 328 provides the raw values received as best samples 326 to an absolute value output 332 as a positive value in accordance with the following equation:

Absolute Value Output 332=|Best Sample 326|.

Bit slicer circuit 330 resolves the raw digital values from best samples buffer circuit 322 to values +1, 0, −1 values. In one embodiment, a raw value provided as best samples 326 that is greater than zero is provided to a resolved output 334 as a +1, a raw value provided as best samples 326 that is exactly zero is provided to a resolved output 334 as a 0, and a raw value provided as best samples 326 that is less than zero is provided to a resolved output 334 as a −1. In some cases, resolution is only to +1 and −1, where +1 corresponds to best sample values greater than zero, and −1 corresponds to best sample values less than or equal to zero. Alternatively, resolution may be to '1' for best sample values greater than zero, and '0' for best sample values less than or equal to zero.

Resolved output 334 is provided to a shift register circuit 338 operating as a first in, first out memory storing a defined number of bits. In one particular embodiment of the present invention, the defined number of bits corresponds to the number of bits in the sector address mark pattern. Bits 342 from shift register circuit 338 are provided to a comparator circuit 344. Comparator circuit 344 also receives bits 346 corresponding to a defined pattern 350. Defined pattern 350 is the expected sector address mark, and may be programmable or fixed depending upon the implementation of phase shift based polarity detection circuit 300. When bits 342 are equivalent to bits 346, comparator circuit 344 asserts a pattern found signal 348 as an indication that the sequence corresponding to the sector address mark was found in the received data.

Absolute value output 332 is provided to a summation circuit 336 that provides a sum output 340. Sum output 340 is a running sum of the most recently received, defined number of samples. The defined number of samples is the same as the defined number of bits in shift register circuit 338. Sum output 340 is calculated in accordance with the following equation:

$$\text{Sum Output } 340 = \sum_{n=0}^{k-1} (\text{Absolute Value Output } 332)_n,$$

where n indicates a respective one of absolute value output 332, and k is the aforementioned defined number of samples received as absolute value output 332.

A center determination circuit 374 receives sum output 340 and pattern found signal 348. Based upon the aforementioned inputs, center determination circuit 374 determines whether the head assembly from which analog input signal 302 was received is inverted or non-inverted. The center of a spiral waveform is identified where a sector address mark is found as indicated by pattern found signal 348 where sum output 340 is greater than a sum output 340 corresponding to a preceding pattern found signal 348, and less than a sum output 340 corresponding to a succeeding pattern found signal 348. A center location value 380 indicating the location of the identified sector address mark is provided. In particular, the following pseudo-code represents the operation of center location circuit 374:

```
If (Pattern Found Signal 348 is Asserted)
{
    If (Sum Output 340 > Preceding Sum Output)
    {
        Preceding Sum Output = Sum Output 340
    }
    Else
    {
        Provide the Location of the Pattern Found Signal 348 as Center
        Location Value 380
    }
}
```

Center location value 380 may be any value known in the art that is capable of identifying a location on a storage medium. Center location value 380 may then be used as a reference for writing other information to the storage medium.

Of note, some embodiments of the aforementioned embodiments may be modified to account for situations where the analog input signal exhibits multiple sequential patterns having a sum output of approximately the same magnitude (e.g., within five percent), the center of the multiple identified patterns may be reported as center location value 380. Such a modification may be made by modifying center location circuit 374 in accordance with the following pseudo-code:

```
If (Pattern Found Signal 348 is Asserted)
{
    If (Sum Output 340 >> Preceding Sum Output) - where '>>' indicates substantially greater than
    {
        Preceding Sum Output = Sum Output 340;
        Initialize x = 0;
    }
    Else If (Sum Output 340 ≈ Preceding Sum Output)
    {
        Store Location_x;
        Increment x
    }
    Else
    {
```

$$AverageLocation = \frac{\sum_{0}^{x-1} Location_x}{x};$$

```
        Provide the Average Location as Center Location Value 380
    }
}
```

As another example of the aforementioned embodiments may be modified to account for situations where the analog input signal exhibits multiple sequential patterns having a sum output of approximately the same magnitude (e.g., within five percent), the center between the identified pattern preceding the level portion and the identified pattern succeeding the level portion is identified and reported as center location value 380. Such a modification may be made by modifying center location circuit 374 in accordance with the following pseudo-code:

```
If (Pattern Found Signal 348 is Asserted)
{
    If (Sum Output 340 >> Preceding Sum Output) - where '>>' indicates
    substantially greater than
    {
        Preceding Sum Output = Sum Output 340;
        Start Location = the location of pattern found signal 348
    }
    Else If (Sum Output 340 << Preceding Sum Output)
    {
        Store Location_x;
        End Location = the location of pattern found signal 348;
        Center Location Value 380 = (Start Location + End Location)/2
    }
}
```

FIGS. 4a-4c graphically depicts a spiral pattern in relation to tracks on a storage medium. Analog input signal 302 may be derived by passing a head assembly (not shown) that traverses a spiral pattern at an angle other than zero. FIGS. 4a-4c and the discussion thereof are adapted from U.S. Pat. No. 7,738,200 entitled "Systems and Methods for Estimating Time Corresponding to Peak Signal Amplitude" and filed by Annampedu et al. on May 1, 2006. The entirety of the aforementioned patent application is incorporated herein by reference for all purposes. Turning specifically to FIGS. 4a-4b, a storage medium 400 is depicted with a spiral pattern 410 formed thereon. In one particular case, spiral pattern 410 includes a repeating pattern of a preamble sequence and sector address mark. In addition, two tracks 450, 455 are also shown on storage medium 400 as dashed lines. Tracks 450, 455 may be formed as concentric circles on storage medium 400 at known distances from an outer edge 405 of storage medium 400. The data stored on storage medium 400 may be serially arranged along tracks 450, 455. It should be noted that a much larger number of tracks may be used in accordance with embodiments of the present invention and that the depiction of only two tracks is intended to simplify the description.

As shown, spiral pattern 410 extends in a smooth spiral shape from an outer edge 405 of storage medium 400 to an inner edge 495 of storage medium 400. In some cases, spiral pattern 410 is formed when the head of an external servo writer writes a repeating pattern as storage medium 400 is rotated at a constant rate and the head of the external servo writer is moved from outside edge 405 to inner edge 495 also at a constant rate. Using such an approach, any circumferential location along spiral pattern 410 is a function of distance from outer edge 405. Based on the disclosure provided herein, one of ordinary skill in the art will recognize other approaches that may be utilized for forming spiral pattern 410 on storage medium 400.

Track 450 intersects spiral pattern at a location 440, and an angle 470. Track 455 intersects spiral pattern 410 at a location 430, and an angle 480. The angle at which a track intersects spiral pattern 410 is a function of the number of revolutions included in spiral pattern from outer edge 405 to inner edge 495 and in some cases can be programmed at the time spiral pattern 410 is written on storage medium 400. As shown, spiral pattern 410 makes approximately two revolutions around storage medium 400 resulting in relatively large angles 470, 480. However, spiral pattern 410 is merely exemplary and it should be noted that spiral pattern 410 may make many more revolutions as it progresses from outer edge 405 to inner edge 495. This increase in revolutions results in a corresponding decrease in angles 470, 480. In some embodiments, the number of revolutions is high and the corresponding intersection angles are close to zero, but still non-zero.

An exemplary wedge 475 extending from an edge 473 to another edge 477 is included as part of storage medium 400. Wedge 475 can be one of many wedges distributed like spokes of a wheel across the circumference of storage medium 400. Wedge 475 may be written with a standard servo data pattern including a preamble, a sync, a gray code and a burst. In accordance with some embodiments of the present invention, this servo data pattern may be written at locations along particular tracks using spiral pattern 410 as a location guide. In particular, a location for servo data within wedge 475 may be defined as a distance, D1, from intersection point 440, or a distance, D2, from intersection point 430. In some cases, D1 and D2 are measured as times where storage medium 400 is rotated at a known rate.

In an exemplary operation, storage medium 400 is provided with spiral pattern 410 formed thereon. Storage medium 400 is installed in a disk drive that includes a read/write head assembly disposed near the surface of storage medium 400. Storage medium 400 is rotated in relation to the head assembly. As storage medium 400 rotates, the read/write head assembly (not shown) traverses along a traversal path that intersects spiral pattern 410 at particular intersection locations depending upon the distance of head assembly from outer edge 405. By detecting the intersection location, the distance of the head assembly from outer edge 405 can be determined, along with a circumferential location relative to a starting point 404 of spiral pattern 410. Based on this information, the location of the read/write head assembly can be adjusted in relation to outer edge 405 such that it is disposed over a selected one of tracks 450, 455. In addition, storage medium 400 can be rotated such that the read/write head assembly is located at one of the edges 473, 477 of wedge 475. Thus, for example, where the servo data is to be written as part of track 455 at wedge 475, the head assembly can be positioned at edge 473 where it intersects track 455. From this location, storage medium 400 is rotated at a known rate such that the head assembly traverses a portion 418 of track 455. As the head assembly traverses portion 418, a modulating electric current is passed through the read/write head assembly causing the servo data to be written along portion 418. This process is repeated for the other wedges (not shown) that are distributed on the surface of storage medium 400, and for other tracks also distributed on the surface of storage medium 400.

FIG. 4c graphically depicts the intersection between spiral pattern 410 and a track along a traversal path 479. Traversal path 479 indicates the path traversed from right to left by the head assembly as storage medium 400 is rotated in relation thereto. As shown by traversal path 479, the head assembly begins to intersect spiral pattern 410 at an angle 471, and a location/time 412. At this point, the head assembly moving along traversal path 479 begins detecting spiral pattern 410, but the detected signal amplitude is relatively small due to the limited cross over between the head assembly and the spiral pattern. As the head assembly continues moving along traversal path 479, the cross over with spiral pattern 410 increases resulting in a corresponding increase in the detected signal amplitude. This increase in detected signal amplitude is graphically depicted as a region 429 of increasing amplitude of an overall detected signal pattern 419. The detected signal amplitude continues to increase until a location/time 422 where spiral pattern 410 is entirely under the head assembly. A transitional region 439 is traversed where the detected signal amplitude remains substantially constant. This continues until a location/time 432 where the head assembly begins to move away from spiral reference path 410. As the head assembly moves away from spiral reference path 410, the amplitude of the detected signal begins to decrease. This results in a region 449 of decreasing signal amplitude. Such a traversal of spiral pattern 410 along traversal path 479 results in a symmetry of overall detected signal pattern 419.

As will be appreciated by one of ordinary skill in the art based on the disclosure provided herein, the shape of overall detected signal pattern 419 may be changed where one, or more variables are modified. The depicted "submarine" shape may assume more of "football shape" or more of a "diamond" shape or "elongated diamond" shape as one or more variables is/are modified. For example, where intersection angle 471 is increased, the length of time that the head spends traversing spiral pattern 410 decreases causing the rate of the increase in amplitude at region 429 and the rate of decrease in amplitude at region 449 to accelerate. In addition, the length of transitional region 439 decreases. In some cases, the length of transitional region 439 is reduced to zero. In such cases, transitional region 439 is an immediate transition of zero length from an area of increasing amplitude to an area of decreasing amplitude. As another example, where the area that is detectable by the head assembly is narrowed (i.e., traversal path 479 is narrower), the length of overall detected signal pattern 419 is decreased. Further, it should be noted that overall detected signal pattern 419 is shown with exemplary repetition of the signal written as part of spiral pattern 410, but that many more repetitions are common within region 429 and region 449. Thus, where approximately two peaks are shown in each of regions 429, 449, an actual detected signal may include ten or more peaks within each region. Of note, the preamble and sector address mark portions (487, 489) of input signal 488 of FIG. 4d represent preamble and sector address mark portions (487, 489) of FIG. 4c. As shown in FIG. 4c, a number of sector address marks (i.e., 489b, 489c) occur during the level region (i.e., the region of maximum amplitude). Further the end location corresponds to sector address mark 489d, and the start location corresponds to sector address mark 489a.

Figure 5:
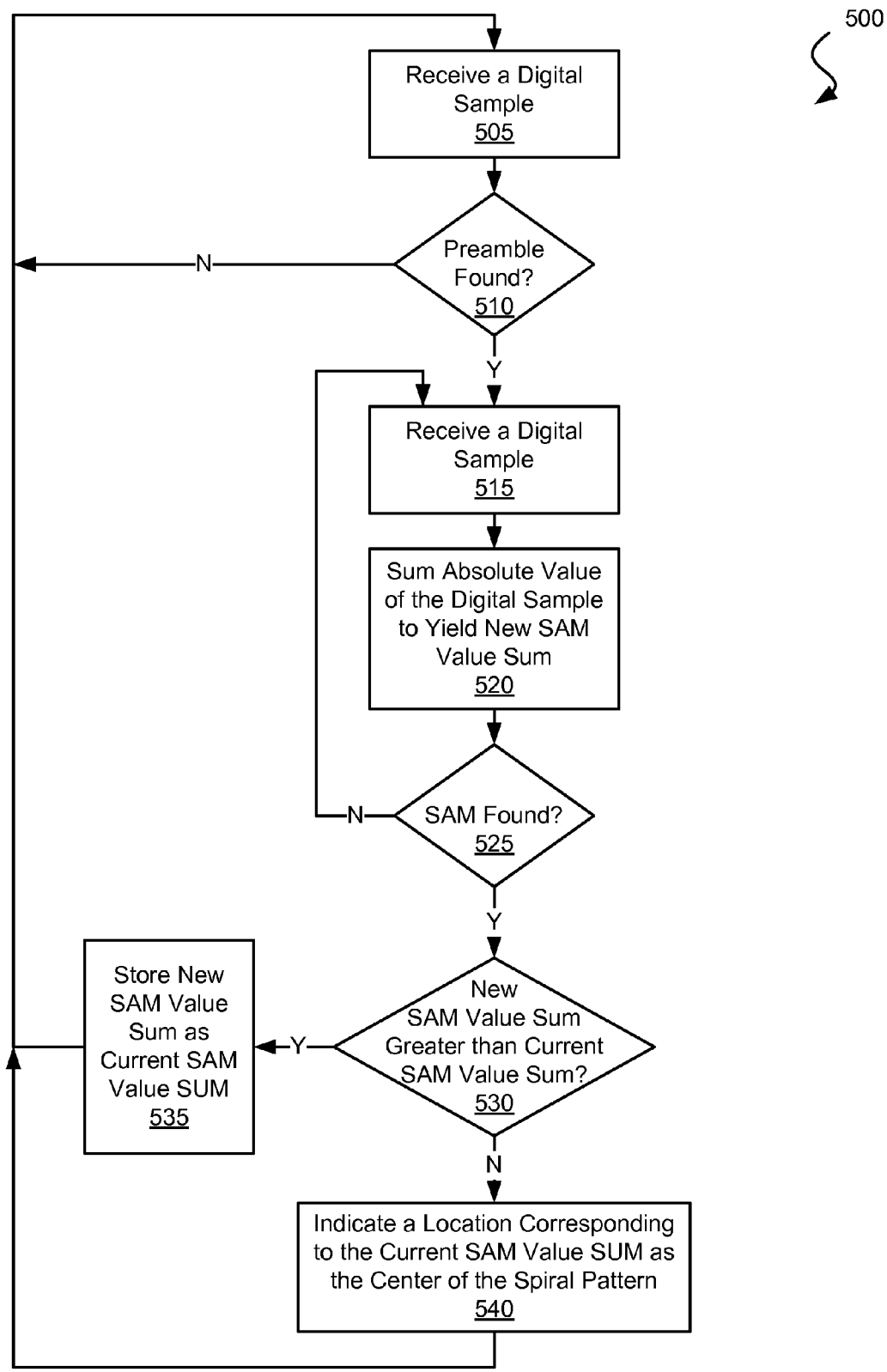
FIG. 5 is a flow diagram showing a method in accordance with various embodiments of the present invention for locating a spiral pattern.

Turning to FIG. 5, a flow diagram 500 shows a method in accordance with various embodiments of the present invention for locating a spiral pattern. Following flow diagram 500, a digital sample is received (block 505). This digital sample may be derived from information on a storage medium. It is determined whether the most recently received digital sample (block 510) in combination with previously identified digital samples yielded a preamble (block 510). Where it did not yield a preamble (block 510), the process of receiving an additional sample and checking for a found preamble is repeated.

Alternatively, where a preamble is found (block 510), the next digital sample is received (block 515). The absolute value of the received digital sample is added to a running sum of digital samples to yield a new SAM value sum (block 520). The new SAM value sum includes a number of digital samples corresponding to the number of bit periods in a sector address mark pattern. Thus, for example, where the sector address mark is twenty bit periods in length, the new SAM value sum is a sum of the most recent twenty digital samples. In addition, it is determined whether the received digital sample resulted in finding a sector address mark (block 525). This is determined by comparing the most recently received digital samples resolved to binary values with a defined bit pattern. Where there is a match, the sector address mark is indicated as found.

Where a sector address mark is found (block 525), it is determined whether the new SAM value sum is greater than the current SAM value sum (block 530). Where the new SAM value sum is greater than the current SAM value sum (indicating region 429 of increasing amplitude) (block 535), the new SAM value sum is stored as the current SAM value sum (block 535) and the process is repeated for the next series of preamble and sector address mark. Alternatively, where the new SAM value sum is not greater than the current SAM value sum (transitional region 439 or region 449 of decreasing signal amplitude) (block 530), the level region has been reached and a location corresponding to the current SAM value sum (i.e., the previously identified SAM location) is identified as the center of the spiral pattern (block 540). Thus, the location of the sector address mark directly preceding the end location is identified as the center of the spiral pattern.

It should be noted that other approaches for identifying the center of the spiral waveform may be used in accordance with different embodiments of the present invention. For example, the alternate approaches discussed above in relation to FIG. 3 may be used in relation to different embodiments of the present invention.

It should be noted that the circuits and approaches herein may be combined with the circuits and approaches for determining signal polarity that is discussed in U.S. patent application Ser. No. 12/955,789 entitled "Systems and Methods for Signal Polarity Determination" and filed by Annampedu et al. on a date even herewith. The aforementioned reference is assigned to an entity common hereto, and the entirety of the aforementioned application is incorporated herein by reference for all purposes.

Figure 6:
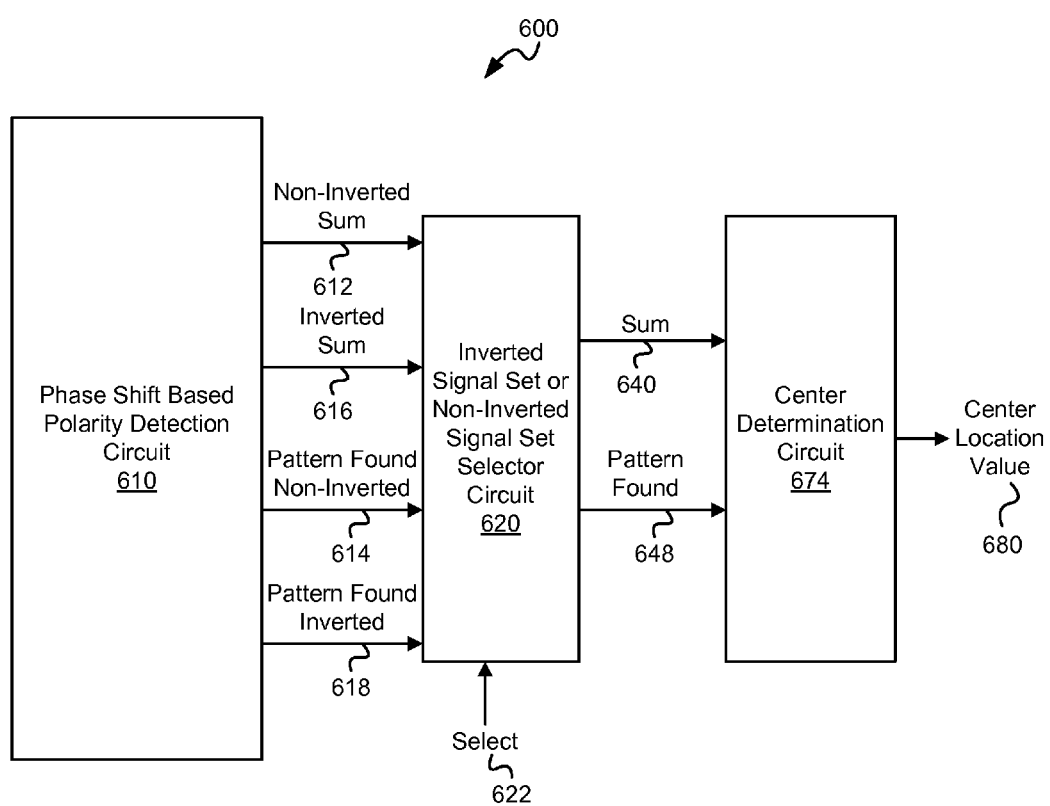
FIG. 6 depicts a combination phase shift based polarity detection circuit and center determination circuit in accordance with particular embodiments of the present invention.

FIG. 6 depicts an example combination phase shift based polarity detection circuit and center determination circuit 600 in accordance with particular embodiments of the present invention. As shown, combination circuit 600 includes a phase shift polarity detection circuit 610 that may be implemented similar to the circuit described in FIG. 3 of the previously referenced patent application entitled "Systems and Methods for Signal Polarity Determination". A non-inverted sum output 612, an inverted sum output 616, a pattern found non-inverted signal 614, and a pattern found inverted signal 618 are provided from phase shift polarity detection circuit 610 to a selector circuit 620 operable to select between either non-inverted sum output 612 and pattern found non-inverted signal 614, or inverted sum output 616 and pattern found inverted signal 618 depending upon an assertion level of a select input 622. Select input 622 is asserted depending upon the polarity (inverted or non-inverted) detected by phase shift polarity detection circuit 610. The selected pair of inverted or non-inverted signal outputs are provided as a sum output 640 and a pattern found output 648 to a center determination circuit 674. Center determination circuit 674 detects a center of a spiral waveform using one of the approaches discussed above in relation to FIG. 3. The detected center is reported as center location value 680. Based upon the disclosure provided herein, one of ordinary skill in the art will recognize a variety of circuits and methods that may use the outputs available from a phase shift polarity detection circuit such as that described in the patent application entitled "Systems and Methods for Signal Polarity Determination" in combination with a center determination circuit such as that described herein in relation to FIG. 3 to detect a center of a spiral pattern.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for locating a spiral pattern on a storage medium. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A location detection circuit, the circuit comprising:
   a pattern detection circuit operable to identify a subset of a series of data samples corresponding to a defined pattern, and to indicate a location of the identified subset of the series of data samples, wherein the series of data samples corresponds to a spiral pattern;
   a computation circuit operable to sum a value of each sample of the subset of the series of data samples to yield a sum; and
   a center determination circuit operable to identify a location of the spiral pattern using the sum.

2. The circuit of claim 1, wherein the circuit further includes:
   a sample buffer circuit operable to maintain the subset of the data samples.

3. The circuit of claim 1, wherein the circuit further includes:
   a bit slicer circuit operable to resolve the series of data samples into a series of corresponding binary values, wherein the pattern detection circuit compares the series of corresponding binary values to the defined pattern.

4. The circuit of claim 1, wherein data samples having a value greater than zero are assigned a first binary value, and data samples having a value less than zero are assigned to a second binary value.

5. The circuit of claim 1, wherein the circuit is implemented as part of an integrated circuit.

6. The circuit of claim 1, wherein the circuit is implemented as part of a storage device.

7. The circuit of claim 1, wherein the sum is a current sum, and wherein identifying the location of the spiral pattern using the sum includes:
   comparing the current sum with a previously calculated sum, wherein the current sum is greater than the previously calculated sum; and
   replacing the previously calculated sum with the current sum.

8. The circuit of claim 1, wherein the sum is a current sum, and wherein identifying the location of the spiral pattern using the sum includes:
   comparing the current sum with a previously calculated sum, wherein the current sum is less than the previously calculated sum; and selecting the location of the identified subset of the series of data samples as a center of the spiral pattern.

9. A method for locating a spiral pattern, the method comprising:

receiving a series of data samples corresponding to an analog input, wherein the series of data samples corresponds to a spiral pattern;

performing a defined pattern detection on the series of data samples, wherein a subset of the series of data samples corresponds to a defined pattern and providing a pattern found indication;

summing an absolute value of each sample of the subset of the series of data samples to yield a sum; and determining a location of a spiral pattern based on the sum.

10. The method of claim 9, wherein the sum is a current sum, and wherein determining the location of the spiral pattern includes:

comparing the current sum with a previously calculated sum, wherein the current sum is greater than the previously calculated sum; and replacing the previously calculated sum with the current sum.

11. The method of claim 9, wherein the sum is a current sum, and wherein determining the location of the spiral pattern includes:

comparing the current sum with a previously calculated sum, wherein the current sum is less than the previously calculated sum; and selecting a location of the pattern found indication as a center of the spiral pattern.

12. The method of claim 9, wherein the subset of the series of data samples is a first subset of data samples, wherein the pattern found indication is a first pattern found indication, and wherein determining the location of the spiral pattern includes:

performing a defined pattern detection on the series of data samples, wherein a second subset of the series of data samples corresponds to the defined pattern and providing a second pattern found indication, and wherein the second pattern found indication corresponds to a region of the spiral pattern exhibiting increasing amplitude;

storing a first location corresponding to the second pattern found indication;

performing a defined pattern detection on the series of data samples, wherein a third subset of the series of data samples corresponds to the defined pattern and providing a third pattern found indication, and wherein the third pattern found indication corresponds to a region of the spiral pattern exhibiting decreasing amplitude; and averaging the first location with a second location corresponding to the third pattern found indication to yield a center of the spiral pattern.

13. The method of claim 12, wherein the sum is a current sum, wherein the region of the spiral pattern exhibiting increasing amplitude is determined by:

summing an absolute value of each sample of the second subset of the series of data samples to yield a previous sum; and comparing the current sum with the previous sum, wherein the current sum is greater than the previous sum.

14. The method of claim 12, wherein the sum is a current sum, wherein the region of the spiral pattern exhibiting decreasing amplitude is determined by:

summing an absolute value of each sample of the third subset of the series of data samples to yield a succeeding sum; and comparing the current sum with the succeeding sum, wherein the current sum is greater than the succeeding sum.

15. The method of claim 9, wherein the defined pattern is a sector address mark pattern.

16. The method of claim 9, wherein the spiral pattern includes a group of preamble patterns interleaved with a group of sector address mark patterns.

17. A storage device, the storage device comprising:

a storage medium, wherein a spiral pattern is stored on the storage medium;

a processing circuit operable to receive a signal corresponding to the spiral pattern and to provide a series of data samples corresponding to the spiral pattern; and a location detection circuit including:

a pattern detection circuit operable to receive the series of data samples, to identify a subset of the series of data samples corresponding to a defined pattern, and to indicate a location of the identified subset of the series of data samples;

a computation circuit operable to sum a value of each sample of the subset of the series of data samples to yield a sum;

a center determination circuit operable to identify a location of the spiral pattern on the storage medium using the sum.

18. The storage device of claim 17, wherein the location detection circuit further includes:

a bit slicer circuit operable to resolve the series of data samples into a series of corresponding binary values, wherein the pattern detection circuit compares the series of corresponding binary values to the defined pattern.

19. The storage device of claim 17, wherein the sum is a current sum, and wherein identifying the location of the spiral pattern using the sum includes:

comparing the current sum with a previously calculated sum, wherein the current sum is greater than the previously calculated sum; and replacing the previously calculated sum with the current sum.

20. The storage device of claim 17, wherein the sum is a current sum, and wherein identifying the location of the spiral pattern using the sum includes:

comparing the current sum with a previously calculated sum, wherein the current sum is less than the previously calculated sum; and selecting the location of the identified subset of the series of data samples as a center of the spiral pattern.

* * * * *